US006915189B2

(12) United States Patent
Igloi et al.

(10) Patent No.: US 6,915,189 B2
(45) Date of Patent: Jul. 5, 2005

(54) AIRCRAFT AVIONICS MAINTENANCE DIAGNOSTICS DATA DOWNLOAD TRANSMISSION SYSTEM

(75) Inventors: Tamas M. Igloi, Torrance, CA (US); Ghobad Karimi, Tarzana, CA (US)

(73) Assignee: Teledyne Technologies Incorporated, Los Angeles, CA (US)

( * ) Notice: Subject to any disclaimer, the term of this patent is extended or adjusted under 35 U.S.C. 154(b) by 238 days.

(21) Appl. No.: 10/272,753

(22) Filed: Oct. 17, 2002

(65) Prior Publication Data

US 2004/0078123 A1 Apr. 22, 2004

(51) Int. Cl.⁷ .............................. H04B 7/00; G06F 13/00
(52) U.S. Cl. ............................................ 701/14; 701/35
(58) Field of Search ............................. 701/29, 30, 33, 701/34, 35, 36, 3, 14

(56) References Cited

U.S. PATENT DOCUMENTS

| | | |
|---|---|---|
| 3,754,671 A | 8/1973 | Mortimer |
| 4,312,041 A | 1/1982 | DeJonge |
| 4,409,670 A | 10/1983 | Herndon et al. |
| 4,470,116 A | 9/1984 | Ratchford |
| 4,604,711 A | 8/1986 | Benn et al. |
| 4,626,996 A | 12/1986 | Arlott |
| 4,642,775 A | 2/1987 | Cline et al. |
| 4,729,102 A | 3/1988 | Miller, Jr. et al. |
| 4,823,271 A | 4/1989 | Clark et al. |
| 4,849,893 A | 7/1989 | Page et al. |
| 4,852,031 A | 7/1989 | Brasington |
| 5,111,402 A | 5/1992 | Brooks et al. |
| 5,262,758 A | 11/1993 | Nam et al. |
| 5,270,931 A | 12/1993 | Appleford |
| 5,392,226 A | 2/1995 | Hamilton |
| 5,404,528 A | 4/1995 | Mahajan |
| 5,457,634 A | 10/1995 | Chakravarty |
| 5,493,497 A | 2/1996 | Buus |
| 5,761,625 A | 6/1998 | Honcik et al. |
| 5,815,152 A | 9/1998 | Collier et al. |
| 5,892,948 A | 4/1999 | Aoki et al. |
| 5,948,026 A | 9/1999 | Beemer, II. et al. |
| 5,974,349 A | 10/1999 | Levine |
| 6,047,165 A | 4/2000 | Wright et al. |
| 6,104,914 A | 8/2000 | Wright et al. |
| 6,108,523 A | 8/2000 | Wright et al. |
| 6,148,179 A | 11/2000 | Wright et al. |

(Continued)

FOREIGN PATENT DOCUMENTS

| | | |
|---|---|---|
| DE | 43 10 615 A1 | 10/1994 |
| EP | 0 431 662 A1 | 6/1991 |
| EP | 1 280 316 A3 | 10/2003 |
| FR | 2 667 171 A1 | 3/1992 |
| GB | 2 345 824 A | 7/2000 |

OTHER PUBLICATIONS

"Q'Nial: A Portable Interpreter For The Nested Interactive Array Language, Nial" Software Practice & Experience, vol. 19, No. 2, Feb., 1989 (111–126).

(Continued)

*Primary Examiner*—Yonel Beaulieu
(74) *Attorney, Agent, or Firm*—Sidley Austin Brown & Wood

(57) ABSTRACT

The present invention resides in a system, method and an article of manufacture for transmitting maintenance and diagnostic data from an aircraft. The system has an aircraft, a cellular infrastructures and a data reception unit. The aircraft has an avionics system and a communications unit. The avionics system has a plurality of line replaceable units, and the communications unit is connected to each line replaceable, unit. The cellular infrastructure is in communication with said communications unit after the aircraft has landed. The communication is initiated automatically upon the landing of the aircraft. The data reception unit is connected to the cellular infrastructure.

36 Claims, 9 Drawing Sheets

U.S. PATENT DOCUMENTS

| | | | |
|---|---|---|---|
| 6,154,636 A | | 11/2000 | Wright et al. |
| 6,154,637 A | | 11/2000 | Wright et al. |
| 6,160,998 A | | 12/2000 | Wright et al. |
| 6,163,681 A | | 12/2000 | Wright et al. |
| 6,167,238 A | | 12/2000 | Wright |
| 6,167,239 A | | 12/2000 | Wright et al. |
| 6,167,319 A | | 12/2000 | Harris et al. |
| 6,173,159 B1 | | 1/2001 | Wright et al. |
| 6,181,990 B1 | * | 1/2001 | Grabowsky et al. .......... 701/14 |
| 6,308,045 B1 | | 10/2001 | Wright et al. |
| 6,396,517 B1 | | 5/2002 | Beck et al. |
| 2003/0215128 A1 | * | 11/2003 | Thompson .................. 382/141 |

OTHER PUBLICATIONS

SFIM New Generation ACMS/gse for A319/A320/A321, P. Lemasson, T. Tosi, SFIM Industries, Massy, France, 2 pages, undated.

Non Procedural Flight Mode Determination, Armen Nahapetian, Teledyne Controls, Los Angeles, 2 pages, undated.

Teledyne Controls, Software Documentation, ACMS Trigger Logic Programming, Los Angeles, California, 8 pages (Jun. 1994).

* cited by examiner

AIRCRAFT AVIONICS MAINTENANCE DIAGNOSTICS DATA DOWNLOAD TRANSMISSION SYSTEM

CROSS-REFERENCE TO RELATED APPLICATIONS

This application is related to the commonly-assigned U.S. Pat. No. 6,181,990, entitled "AIRCRAFT FLIGHT DATA ACQUISITION AND TRANSMISSION SYSTEM," issued on Jan. 30, 2001.

BACKGROUND OF THE INVENTION

1. Field of the Invention

The present invention is directed generally to an aircraft maintenance/diagnostic data transmission system and, more particularly, to on-board cellular data transmission/reception system in conjunction with maintenance/diagnostics data transmission over public telephone networks and the Internet.

2. Description of the Related Art

It is common for aircraft avionics and electronic engine control systems to require download of maintenance/diagnostic data for maintenance purposes. Presently, most aircraft utilized in passenger, freighter and business categories require some degree of diagnostic data download from one or more avionics and engine control equipment, such as an Electronic Engine Computer (EEC), Data Encryption Unit (DEU), Flight Management Computer (FMC), etc. These downloads are currently accomplished manually by connecting a download device to the aircraft, or using permanently installed maintenance/diagnostics terminals. The diagnostic information is transferred from the avionics equipment to storage media, such as floppy disks or CD-ROMs. Upon completion of the transfer from the avionics unit to the storage media, the maintenance/diagnostic information is transferred to the maintenance center of the airline for processing.

The current manual download includes the human as an active component of this activity. The steps include the downloading to a media, delivery of the media to the maintenance facilities and transfer of the data from the media to a maintenance computer for analysis.

Computer systems are typically used to analyze and manage the aircraft maintenance/diagnostics for the aircraft. Such systems require manual transportation of the down load media from each aircraft to the maintenance center.

Often times, radio frequency (RF) transmissions are used to transmit maintenance/diagnostic data relating to an aircraft. This technique, however, requires substantial investments to construct the RF transmission systems required for such a system to work. Furthermore, it is very expensive to create redundancy in such a system.

Maintenance/diagnostic data can also be transmitted to an aircraft via a telephone system located in a terminal. Such a system, however, requires that the aircraft be docked at the gate before transmission begins, thereby resulting in not being able to transfer uploads to aircraft that are routinely parked on the tarmac, away from the gates when loading and unloading passengers and cargo. Furthermore, such a system requires an added step of transmitting the download maintenance/diagnostic data from the telephone system to the maintenance center, increasing the cost of installing, operating, and maintaining such a system.

Thus, there is a need for an aircraft maintenance/diagnostics download system that automatically transfers aircraft/engine and maintenance/diagnostic data to the airline's or operator's maintenance and engineering center with little or no human involvement, and which relies on a widely available and reliable public wireless, public switch telephone network (PSTN), integrated services digital network (ISDN), and/or Internet delivery systems.

SUMMARY OF THE INVENTION

The present invention, which addresses this need, resides in a system, method and an article of manufacture for transmitting maintenance and diagnostic data from an aircraft.

The system comprises an aircraft, a cellular infrastructures and a data reception unit. The aircraft has an avionics system and a communications unit. The avionics system comprises a plurality of line replaceable units. The communications unit is connected to each line replaceable unit. The cellular infrastructure is in communication with said communications unit after the aircraft has landed. The communication is initiated automatically upon the landing of the aircraft. The data reception unit is connected to the cellular infrastructure.

The present invention represents a substantial advance over prior aircraft data download systems. For example, the present invention has the advantage that it requires little expense to implement because it uses well-known cellular technology, cellular infrastructure, telephone networks and computer networks, which are already in place. The present invention also has the advantage that it can transmit the diagnostic data over one or more channels to achieve the necessary transmission bandwidth and achieve a low data transmission time. The present invention has the further advantage that it does not require a dedicated data link between the aircraft and the airline/aircraft operator engineering center and/or an airport terminal.

BRIEF DESCRIPTION OF THE DRAWING

For the present invention to be clearly understood and readily practiced, the present invention will be described in conjunction with the following figures, in which like reference numbers represent corresponding parts throughout.

DETAILED DESCRIPTION OF THE INVENTION

In the following description, reference is made to the accompanying drawings which form a part hereof, and which is shown only by way of illustration a specific embodiment in which the invention may be practiced. It is to be understood that other embodiments may be utilized and changes may be made without departing from scope of the present invention It is to be understood that the figures and descriptions of the present invention have been simplified to illustrate elements that are relevant for a clear understanding of the present invention, while eliminating, for purposes of clarity, other elements found in a typical communications system. It can be recognized that other elements are desirable and/or required to implement a device incorporating the present invention. For example, the details of the avionics and engine maintenance data download method, the cellular communications infrastructure, the Internet, and the public-switched telephone network are not disclosed. However, because such elements are well known in the art, and because they do not facilitate a better understanding of the present invention, a discussion of such elements is not provided herein.

Figure 1:
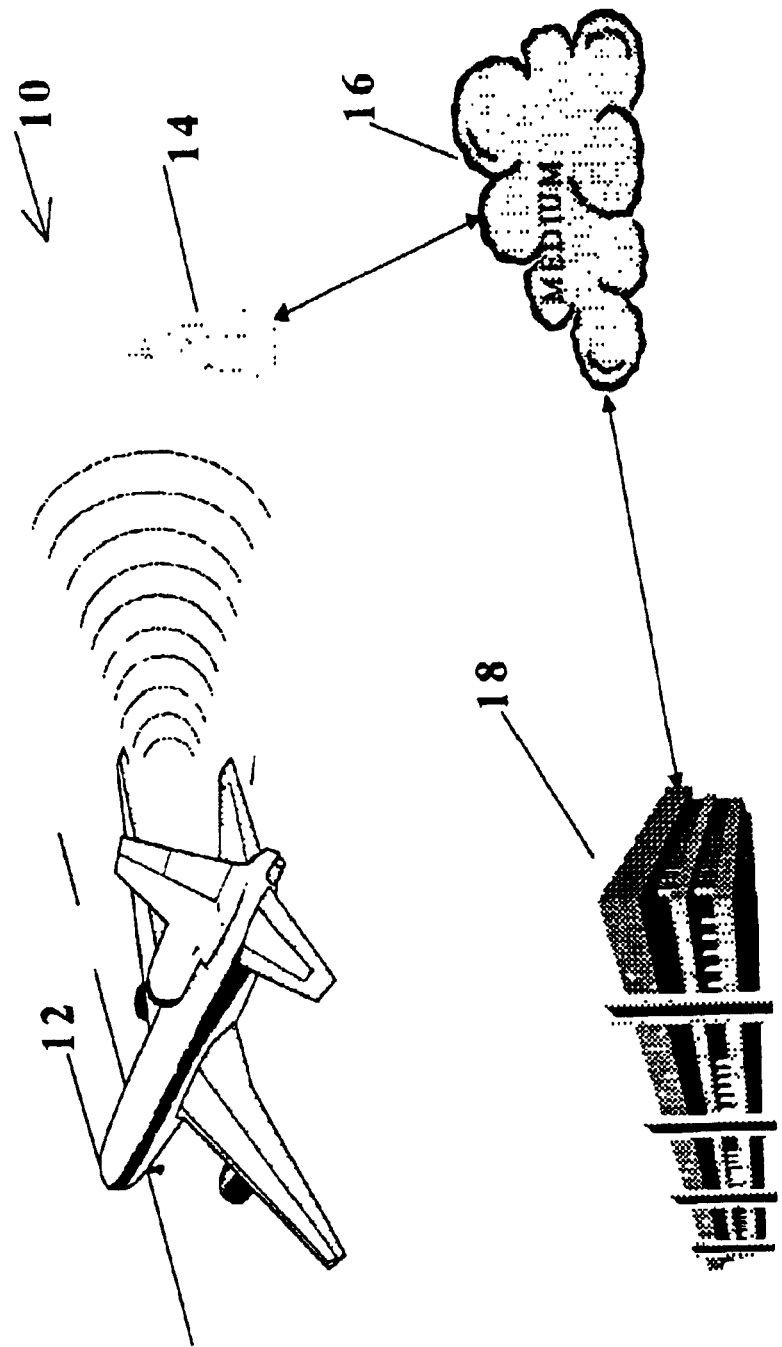
FIG. 1 illustrates an exemplary aircraft maintenance data download and transmission system, in accordance with an embodiment of the present invention.

FIG. 1 illustrates an exemplary aircraft transmission/reception of avionics and engine maintenance/diagnostic data download system 10, in accordance with an embodiment of the present invention. An aircraft 12, which has stored avionics and electronic engine control units maintenance/diagnostics data, is illustrated after landing. The aircraft 12 transmits maintenance/diagnostics data as cellular communications signals over a cellular infrastructure 14. The cellular infrastructure 14 acts as a communications channel to the communications medium 16. Airline/operators engineering center 18 is connected to the medium 16 by any conventional connectivity medium such as, for example, a leased line. Once the cellular connections are made via the medium 16 data can flow bidirectionally to and from the aircraft.

Figure 2:
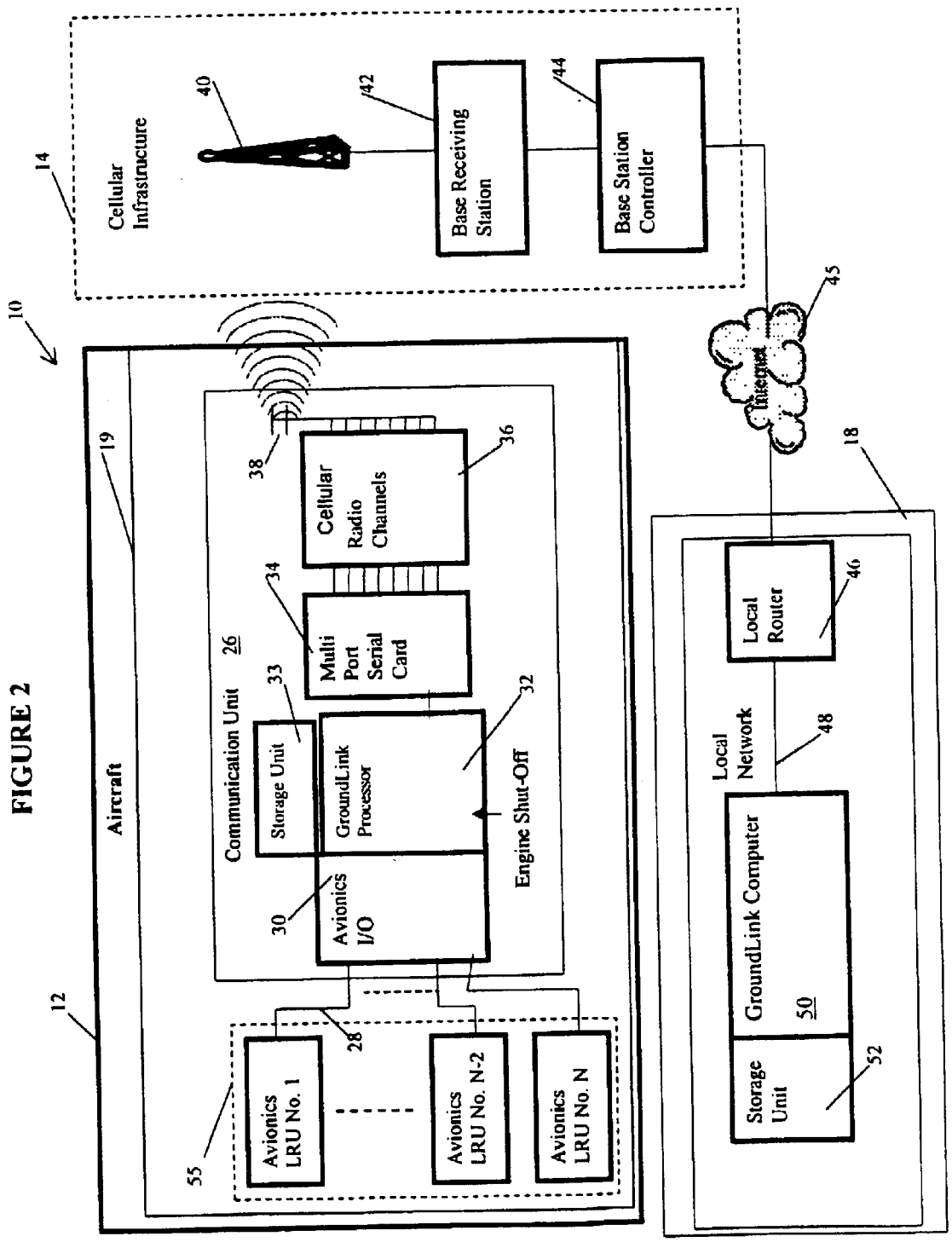
FIG. 2 is a block diagram illustrating a more detailed embodiment of the system illustrated in FIG. 1, in accordance with an embodiment of the present invention.

FIG. 2 is a block diagram illustrating a more detailed embodiment of system 10 illustrated in FIG. 1, in accordance with an embodiment of the present invention. The aircraft 12 includes avionics system 55 having a suite (1 through N) of avionics (and electronic engine control) line replaceable units (LRU). Each avionics and electronic engine control line replaceable unit includes a storage media for storing maintenance/diagnostics data in a digital format.

The maintenance/diagnostics data are transferred from the avionics and electronic engine control unit LRU 55 to the communications unit 26 via a bus 28. The bus 28 is connected to an avionics I/O interface 30 in the communications unit 26. The avionics I/O interface 30 can be a standard bus interface such as, for example, an ARINC 429 bus, RS-232/422 or Ethernet.

The avionics I/O interface 30 is connected to a GroundLink processor 32. The GroundLink processor 32 can be a general purpose processor such as a personal computer, a microprocessor such as an Intel Pentium.RTM processor, or a special purpose processor such as an application specific integrated circuit (ASIC) designed to operate in the system 10. The GroundLink processor is connected to one or more cellular channels 36 via multi port serial card 34.

The GroundLink processor 32 is responsive to an engine shut-off (or equivalent) signal, which notifies the GroundLink processor 32 to initiate transmission of the data after the aircraft 12 has landed. Upon receipt of this signal, the processor 32 acquires the maintenance/diagnostic data from the avionics LRU 55 via the avionics I/O 30, and transmits the data to a multi-port serial card 34. Each I/O port of the card 34 is attached to a cellular channel 36 which can open, sustain, and close a physical, over-the-air, channel to the cellular infrastructure 14. The cellular channels 36 can transmit and receive simultaneously and can thus transmit and receive data in parallel. Each cellular channel 36 is connected to an antenna matching network. One or more antennas 38 are installed in the aircraft 12 so as to optimize free space radiation to the cellular infrastructure 14.

The data are transmitted over cellular air link using the physical layer modulation of the cellular infrastructure 14. The cellular infrastructure 14 includes an antenna 40, which is within free-space radiating range of the aircraft 12. The antenna 40 is connected to a cellular base station transceiver subsystem 42. The subsystem 42 is connected to a cellular base station controller 44 which has a direct connection via a router (not shown) to the Internet 45. The data is transmitted via the Internet 45 to the airline/operators engineering center 18.

A local router 46 in the airline/operators engineering center 18 is connected to the Internet 45, such as via a connection to the backbone of the Internet 45. The router 46 connects a local area network 48 to the Internet 45. The local area network can be of any type of network such as, for example, a token ring network, an ATM network, or an Ethernet network. A GroundLink computer 50 is connected to the network 48 and receives the maintenance/diagnostics data from the specific aircraft tail number for storage in the attached storage unit 52 for analysis by related application programs. The storage unit 52 can be any type of unit capable of storing data such as, for example; disk drive or a disk array.

Data transfer can also occur from airline/operators engineering center 18 to the aircraft 12. The data are transmitted over the Internet 45 and cellular infrastructure 14 and received by antenna 38. The serial card 34 receives the data from the cellular channels 38 and processor 32 outputs the data via the avionics I/O 30 to avionics 55 via bus 28.

Figure 3:
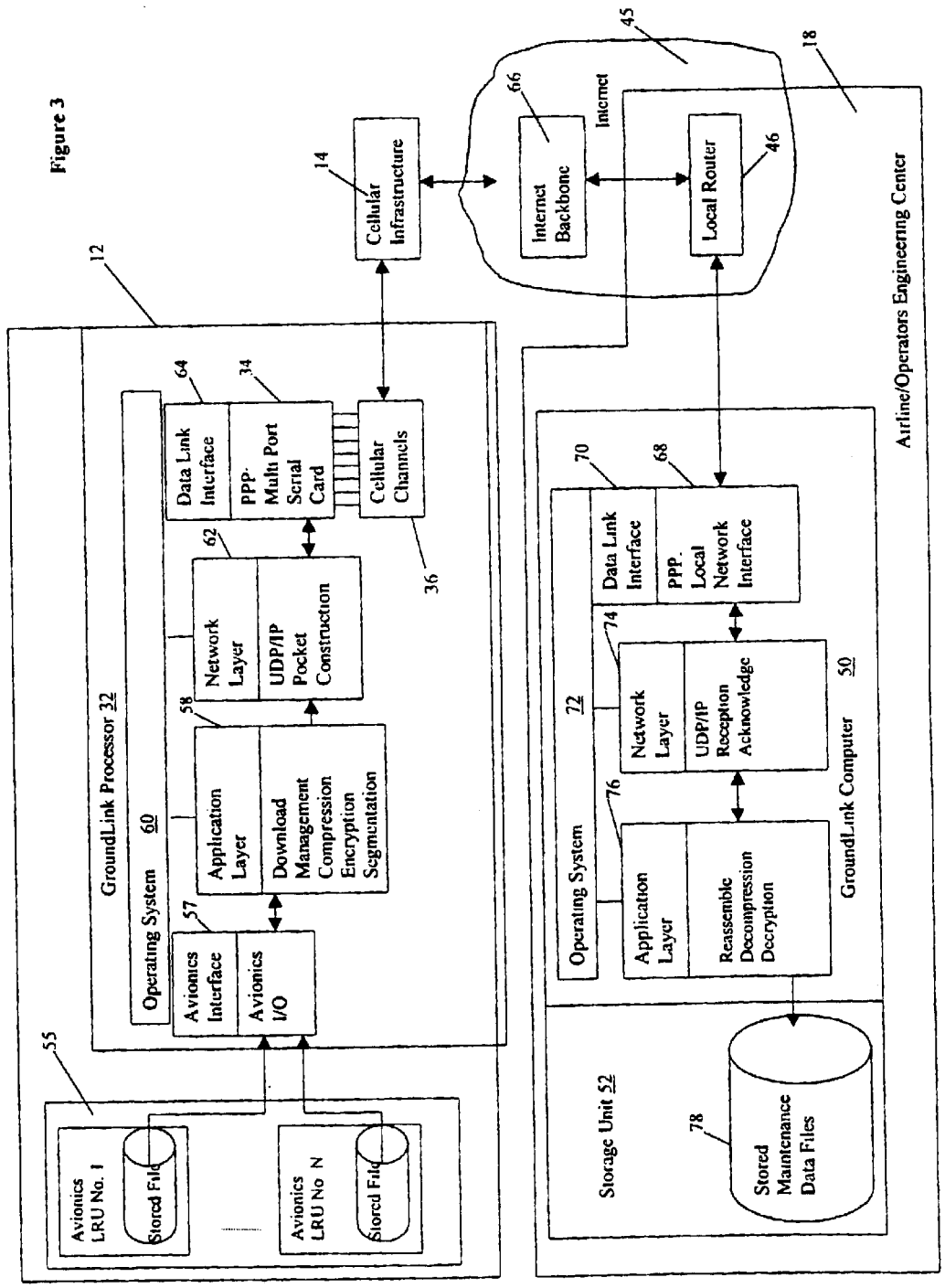
FIG. 3 is a block diagram illustrating data flow through the system illustrated in FIG. 2, in accordance with an embodiment of the present invention.

FIG. 3 is a block diagram illustrating data flow through the system 10 illustrated in FIG. 2, in accordance with an embodiment of the present invention. The maintenance data files are stored by the avionics LRUs. An application layer 58 of an operating system 60 of the GroundLink processor 32 acquires, compresses, encrypts, and segments the data files. The operating system 60 can be any type of operating system suitable such as, for example, UNIX. A typical stored file may be compressed from approximately 1 Mbytes to approximately 100 Kbytes. Compression may be done by any compression method such as, for example, the method embodied in the PKZIP.RTM. compression utility, manufactured by PKWARE, Inc. Encryption can be accomplished using any suitable asymmetric (public key) or symmetric encryption method such as, for example, the method embodied in Data Encryption Software (DES), manufactured by American Software Engineering or the methods in the RC2, RC4, or RC5 encryption software manufactured by RSA Data Security, Inc. During segmentation, individual datagrams of, for example, 1024 bytes are formed and indexed for subsequent reassemble.

The operating system 60 passes the datagrams to a network layer 62 which constructs UDP/IP packets from the datagrams by adding message headers to the datagrams. The network layer 62 then routes the packets to one of up to a fixed number (e.g., 16) peer-to-peer protocol (PPP) threads running within the operating system 60 at a data link layer interface 64. The PPP convey the packets trough the multi port serial card 34 to the cellular channels 36. The packets are routed through the cellular infrastructure 14 to the Internet 45. The packets are received from the internet 45 by the local router 46 in the airline/operators engineering center 18. The network layer 62 receives acknowledgments of received packets from the GroundLink computer 50 in the airline/operators engineering center 18. The network layer 62 also re-queues packets that are dropped before reaching the GroundLink computer 50.

The local router 46 in the airline/operators engineering center 18 receives the packets and routes them to the GroundLink computer 50. A local network interface 68 receives the packets and a data link layer interface 70 of an operating system 72 passes the packets to a network layer 74 of the operating system 72. The operating system 72 can be any type of suitable operating system such as, for example Windows. The network layer 74 sends acknowledgements of successful packet deliveries to the GroundLink processor 32. The network layer 74 also removes the UPD/IP headers and passes the datagrams to an application layer 76. The application layer 76 reassembles, decrypts, and uncompresses the datagrams to restore the file to its original form. The application layer then passes the file 78 to the storage unit 52. The functions performed by the aircraft 12 and the airline/operator engineering center 18 are similarly interchangeable when data is transferred from the airline/operator engineering center 18 to the aircraft 12.

Figure 4:
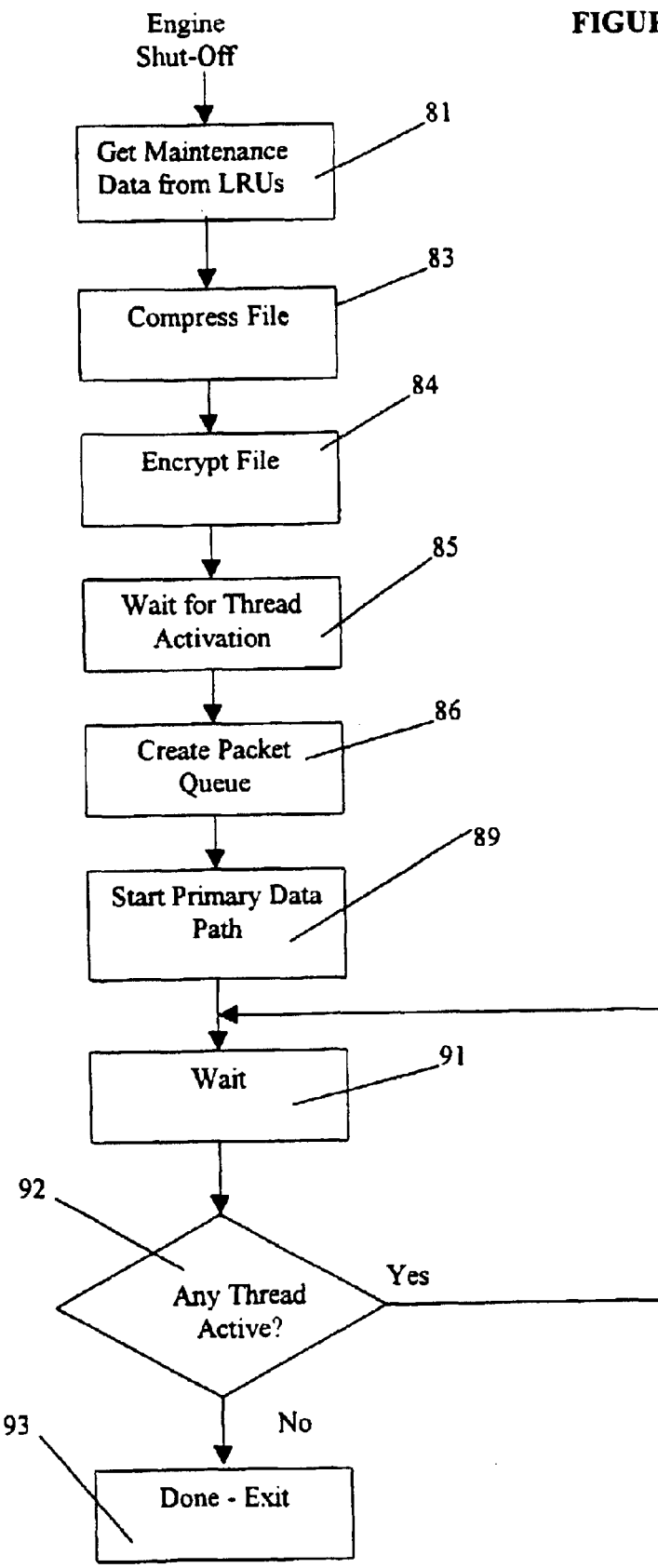
FIG. 4 is a flowchart illustrating a method carried out by the GroundLink processor in the aircraft, in accordance with an embodiment of the present invention.

FIG. 4 is a flowchart illustrating a method carried out by the GroundLink processor 32 in the aircraft, in accordance with an embodiment of the present invention. At step 81, the GroundLink processor 32 receives a "engine shut-off", or similar signal which indicates that data transmission process can be started and the GroundLink processor 32 initiates a data transfer by acquiring maintenance/diagnostics data files from avionics LRUs 55. At step 83, the application layer 58 compresses the acquired files and at step 84 it encrypts the file. At 86 the data is segmented into datagrams and UPD/IP packets are created and the packets are placed in a queue. The packets are ready for transmission over fixed number of threads, corresponding to the number of cellular channels 36. At step 89, the primary data thread is started to make the initial call and open the communications channel to the airline/operators engineering center 18. There is a wait period, for example five seconds, inserted at step 91, and the status of the threads is tested for active state at step 92. If any thread is found active the process loops back to the wait state. If there are no active channels detected at step 92 this method exits at step 93.

Figure 5:
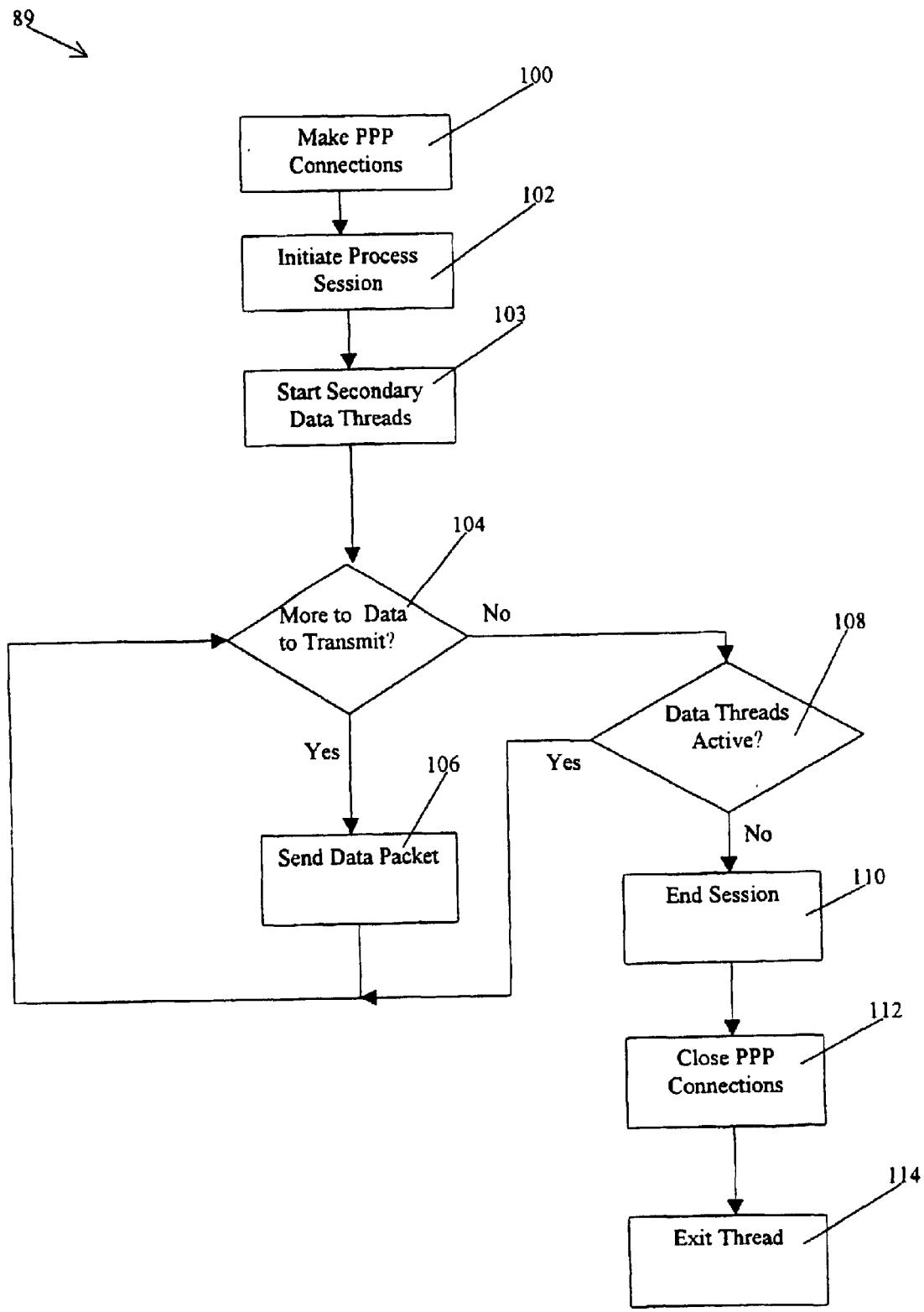
FIG. 5 is a flowchart illustrating a method of performing the start secondary data threads and transmitting data packet step 89 of FIG. 4, in accordance with an embodiment of the present invention.

FIG. 5 is a flowchart illustrating a method of performing the start primary data thread step 89 of FIG. 4, in accordance with an embodiment of the present invention. At step 100 point to point (PPP) connection is initiated. At step 102 the process session is initiated. The secondary data threads are opened at step 103.

At step 104, it is determined if more packets are left to be transmitted. If so, the next packet in the data thread is transmitted at step 106 and the process loops back to step 104 to check if any more packet is available for transmission. If no packets are left to transmit, as determined at step 104, the state of the data threads is checked at step 108. If any data thread is found active at 108, then the process returns to step 104 to see if more data is to be transmitted. If it is found at step 108 that there is no active data thread then the session is ended at step 110. The PPP connections are closed at step 112 and the method exits at step 114.

Figure 6:
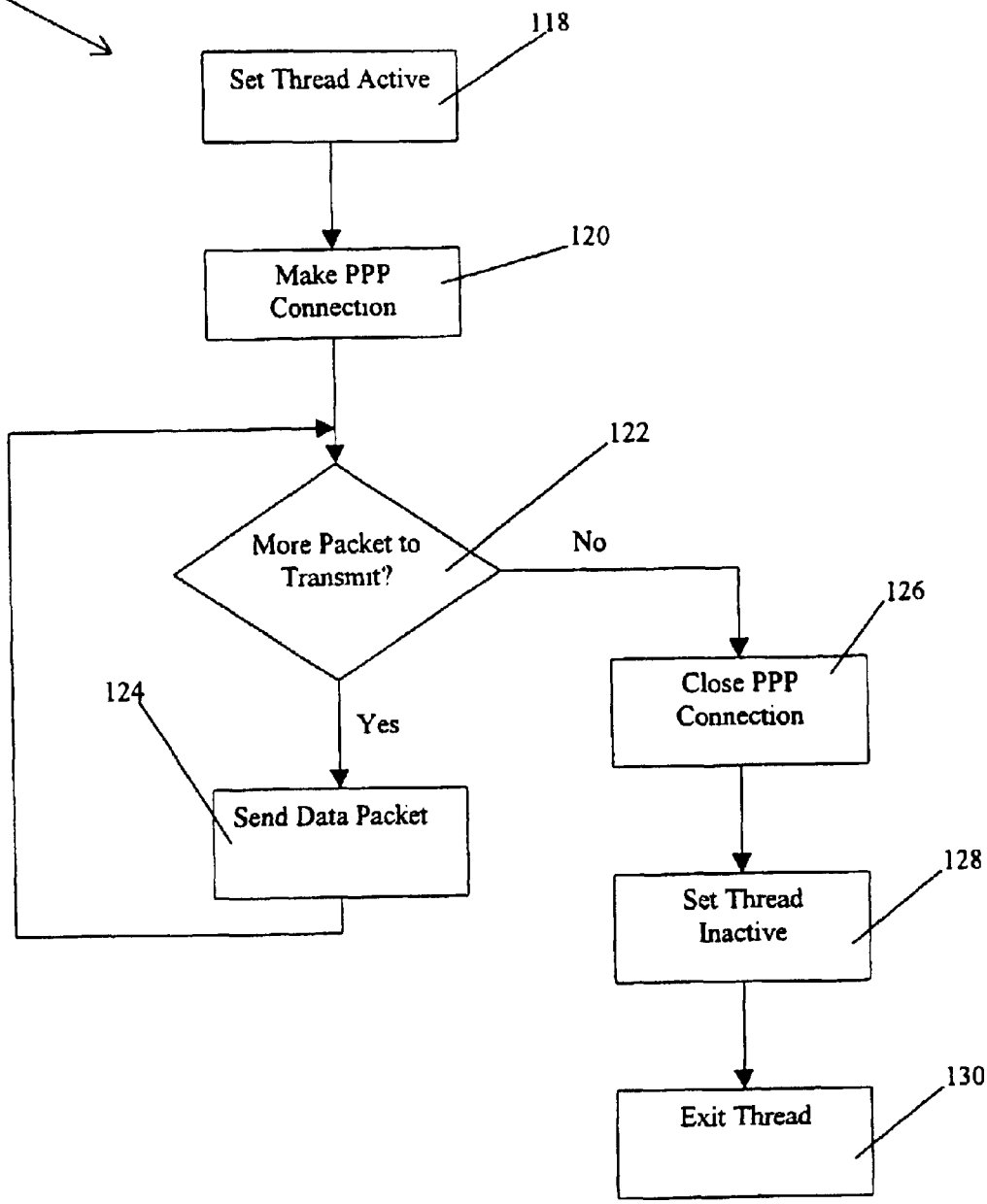
FIG. 6 is a flowchart illustrating a method of performing the start secondary data threads step 103 of FIG. 5, in accordance with an embodiment of the present invention.

FIG. 6 is a flowchart illustrating a method of starting secondary data threads of step 103 of FIG. 5, in accordance with an embodiment of the present invention. All the available secondary data threads are set active in step 118 by the data link interface 64. At step 120 the point to point (PPP) connections are initiated for each secondary data thread through the cellular channels 36 by the data link layer 64. At step 122 a test is made to determine if there are data packets for transmission. If packet is available, it is sent in step 124 to the GroundLink computer. If there is no more data packets to be sent, as determined in step 122, the PPP connections are closed in step 126. The thread is set inactive in step 128 and the thread exits at step 130.

Figure 7:
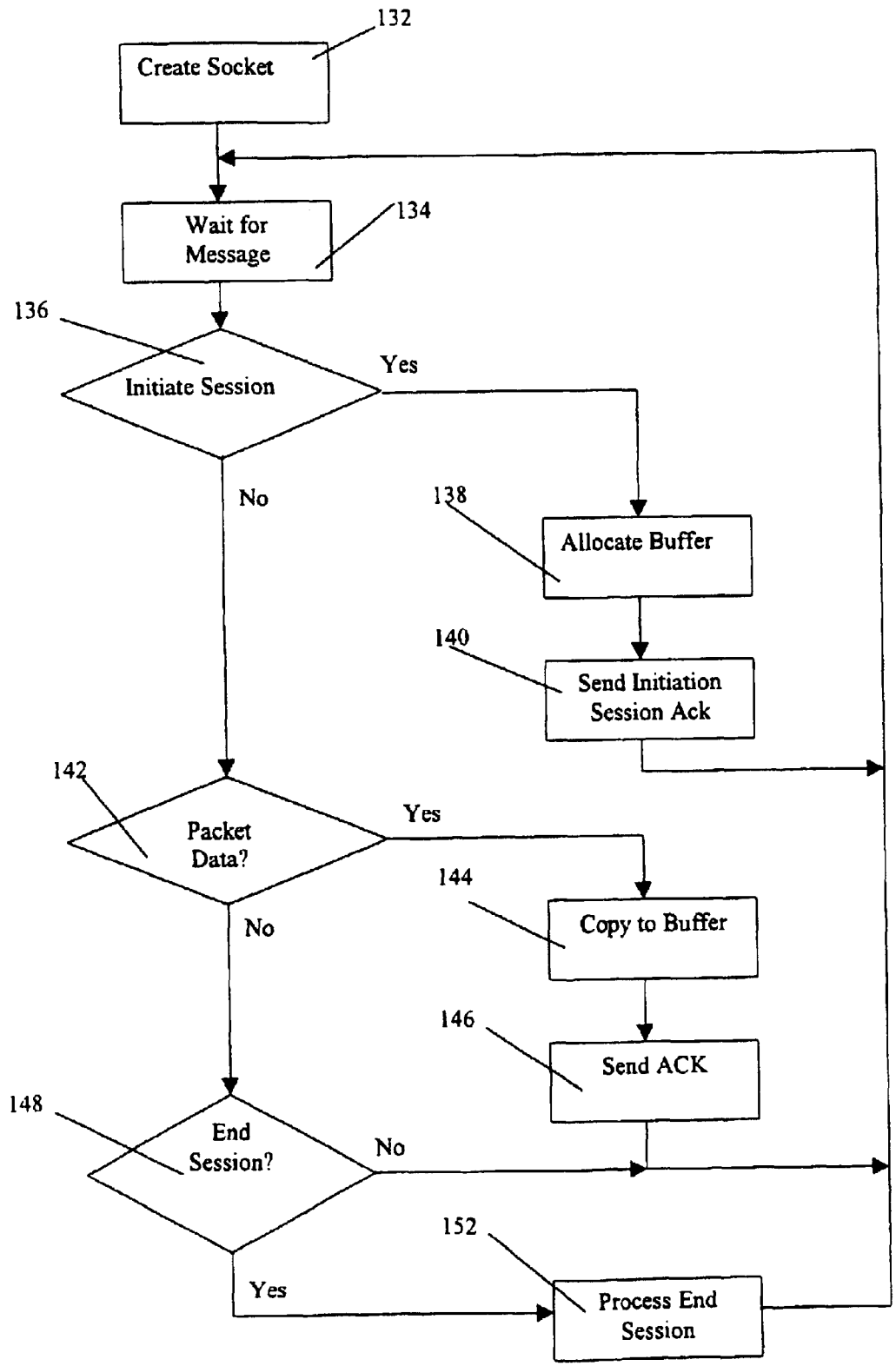
FIG. 7 is a flowchart illustrating a method of operating the GroundLink computer in the airlines/operators engineering center, in accordance with an embodiment of the present invention.

FIG. 7 is a flowchart illustrating a method of operating the GroundLink computer 50 in the airline/operators engineering center 18, in accordance with an embodiment of the present invention. In response to the call placed by the GroundLink processor 32 through the primary channel a socket is opened at step 132 by the operating system 72 in the computer 50 to receive messages transported across the Internet 45. At step 134, the computer 50 waits for a message from the Internet 45. When an initiate session message is received as determined at step 136, the application layer 76 allocates buffer space at step 138, sends a session acknowledgement message at step 140 to the GroundLink processor 32 on the aircraft 12 and the method returns to wait for additional messages at step 134. If the message received was a data packet, as determined at step 142, the network layer 74 removes the UDP/IP header and copies the datagram to the buffer in step 144. At step 146 the network layer 74 sends an acknowledge message to the GroundLink processor 32 on the aircraft 12.

If end session message is detected at step 148 the application layer 76 performs a process end session at step 152 and returns to wait for message step 134.

Figure 8:
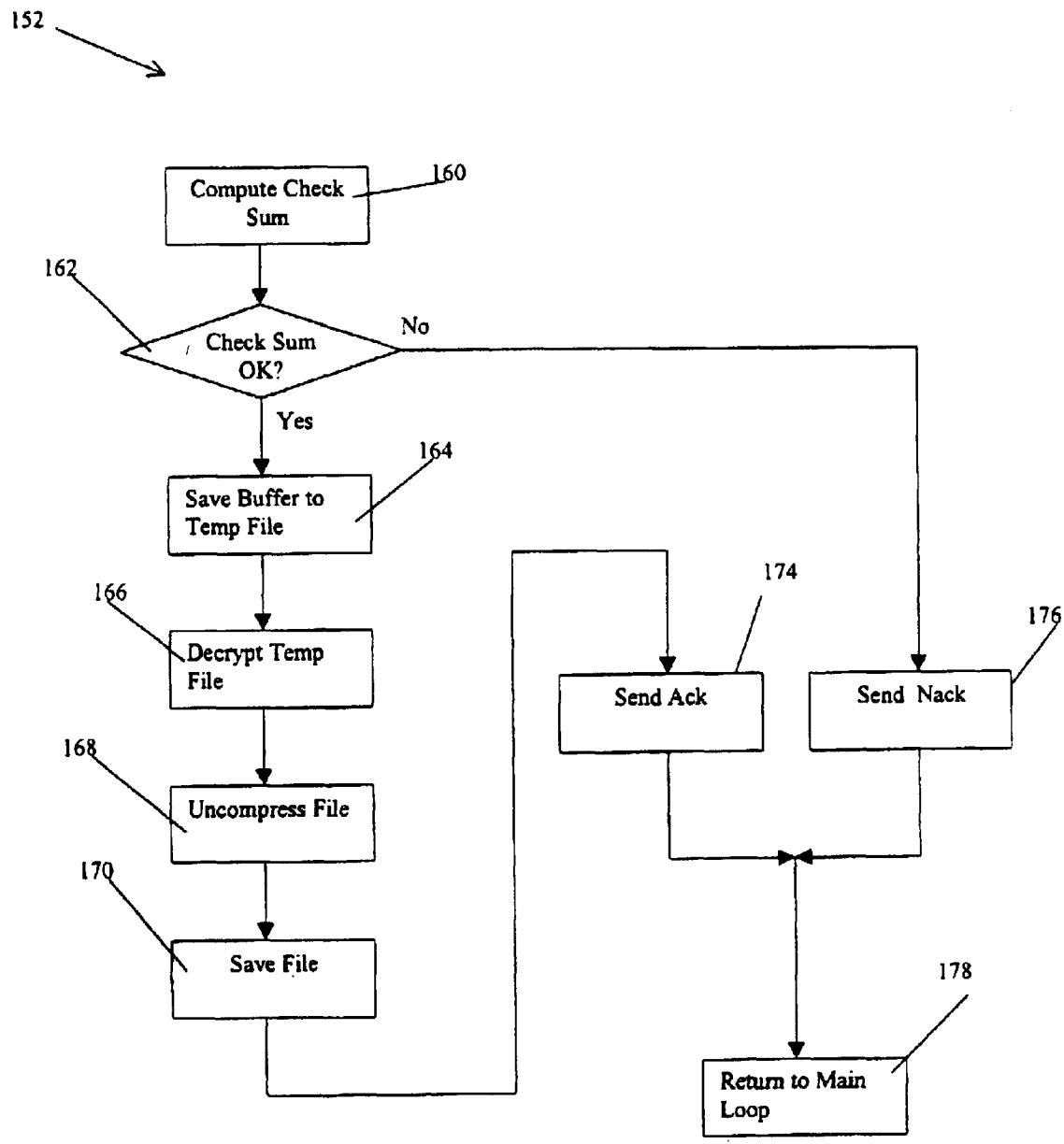
FIG. 8 is a flowchart illustrating a method of performing the process end of session step 152 of FIG. 7, in accordance with an embodiment of the present invention.

FIG. 8 is a flowchart illustrating the steps included in the end session process step 152 of FIG. 7, in accordance with an embodiment of the present invention. At step 160, the checksum is computed by the application layer 76 for the received data to check the integrity of the data. The checksum is checked at step 162 and if it is found to be correct the GroundLink computer 50 saves the buffer to a temporary file at step 164. The application layer 76 of the GroundLink computer 50 then decrypts the file at step 166 and uncompresses the file at step 168. The uncompressed file 78 is stored at step 170 by the operating system 72 on storage unit 52. The GroundLink computer 50 sends an end session acknowledge message to the GroundLink processor 32 on aircraft 12 at step 174 and at step 178 the flow returns to step 134 of FIG. 7. If the checksum is not correct, as determined at step 162, the GroundLink computer 50 sends an unsuccessful end session message (Nack) at step 176, which notifies the GroundLink processor 32 to re-send the data and the flow returns to step 134 of FIG. 7.

Figure 9:
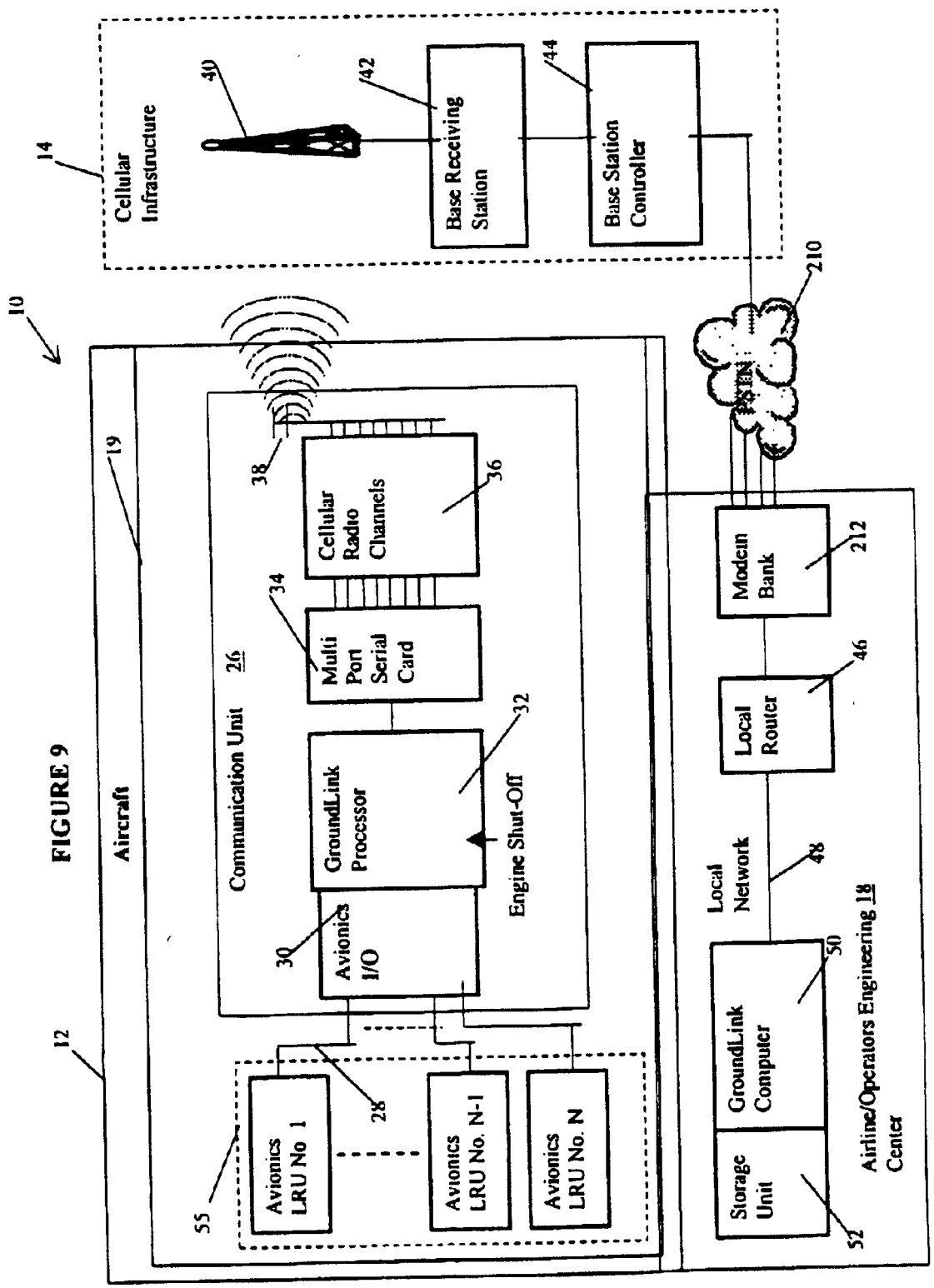
FIG. 9 is a block diagram illustrating another embodiment of the system illustrated in FIG. 1.

FIG. 9 is a block diagram illustrating another embodiment of the system 10 illustrated in FIG. 1. The operation of the system 10 of FIG. 9 is similar to that described in conjunction with the system 10 of FIG. 2. However, the data that is transmitted by the GroundLink processor 32 via the cellular infrastructure 14 is routed by the public switched telephone network (PSTN) 210 to the modem bank 212. A modem bank 212 transmits the data to the GroundLink computer 50 via the local router 46 and local network 48. The modem bank 212 can have a modem dedicated to receive data from each one of the cellular channels 36.

While the present invention has been described in conjunction with preferred embodiments thereof, many modifications and variations will be apparent to those of ordinary skill in the art. For example, although the system has been described hereinabove as transferring data from the aircraft, the system can also be used to transfer data to the aircraft with no modifications in the system. Also, the system may be used to transmit data while the aircraft is in flight. Furthermore, the system may be used without encryption and without data compression prior to sending data. The foregoing description and the following claims are intended to cover all such modifications and variations.

What is claimed is:

1. An aircraft maintenance data transmission system, comprising;
   an aircraft having an avionics system and a communications unit, wherein the avionics system comprises a plurality of line replaceable units, and wherein the communications unit is connected to each line replaceable unit;
   a cellular infrastructure in communication with said communications unit after the aircraft has landed, wherein the communication is initiated automatically upon the landing of the aircraft; and
   a data reception unit connected to the cellular infrastructure.

2. The aircraft maintenance data transmission system of claim 1, wherein the line replaceable unit is an avionics line replaceable unit.

3. The aircraft maintenance data transmission system of claim 1, wherein the line replaceable unit is an electronic engine control line replaceable unit.

4. The aircraft maintenance data transmission system of claim 1, wherein said data reception unit is in communication with said cellular infrastructure via a computer network.

5. The aircraft maintenance data transmission system of claim 4, wherein the computer network is the Internet.

6. The aircraft maintenance data transmission system of claim 1, wherein said data reception unit is in communication with said cellular infrastructure via a telephone network.

7. The aircraft maintenance data transmission system of claim 6, wherein the telephone network is a public switch telephone network.

8. The aircraft maintenance data transmission system of claim 6, wherein the telephone network is an integrated services digital telephone network.

9. The aircraft maintenance data transmission system of claim 1, wherein said communications unit includes:
   an avionics input/output interface;
   a processor that is connected to the avionics input/output interface;
   a multi-port serial card in communication with said processor;
   a plurality of cell channels in communication with said multi-port serial card; and
   one or more antennas in communication with said cell channels.

10. The aircraft maintenance data transmission system of claim 1, wherein said cellular infrastructure includes:
    an antenna;
    a transceiver subsystem in communication with said antenna; and
    a controller in communication with said transceiver subsystem.

11. The aircraft maintenance data transmission system of claim 1, wherein said data reception unit includes:
    a router; and
    a processor in communication with said router, said processor having a storage unit.

12. An aircraft maintenance data system, comprising:
    an avionics system that comprises a plurality of line replaceable units;
    an avionics input/output interface that is connected to each of the line replaceable units;
    a processor that is connected to the avionics input/output interface;
    a multi-port serial card that is connected to the processor; and
    a plurality of cell channels connected to the multi port serial card, said cell channels for transmitting data via a cellular infrastructure after the aircraft has landed, wherein the communication between the cell channels and the multi port serial card is automatically initiated upon the landing of the aircraft.

13. The aircraft maintenance data system of claim 12, further comprising one or more antennas in communication with said cell channels.

14. The aircraft maintenance data system of claim 12, wherein the processor is a personal computer.

15. The aircraft maintenance data system of claim 12, wherein the processor is an application specific integrated circuit.

16. The aircraft maintenance data system of claim 12, wherein the processor is a microprocessor.

17. An aircraft, comprising:
    an avionics system having a plurality of line replaceable units, and
    a communications unit connected to each of the line replaceable units, comprising:
    an avionics input/output interface;
    a processor connected to the avionics input/output interface;
    a multi-port serial card connected to the processor; and
    a plurality of cell channels connected to the multi port serial card, said cell channels for transmitting data via a cellular infrastructure after the aircraft has landed, wherein the communication between the cell channels and the multi port serial card is automatically initiated upon the landing of the aircraft.

18. An aircraft data transmission system, the aircraft having an avionics system, comprising:
    means for transmitting data from the avionics system via a cellular infrastructure after the aircraft has landed, wherein the transmission of the data is initiated automatically upon landing of the aircraft; and
    means for receiving said data from said cellular infrastructure.

19. The aircraft data transmission system of claim 18, wherein said means for transmitting data includes a processor.

20. The aircraft data transmission system of claim 18, wherein said means for receiving data includes a processor.

21. A method of transmitting maintenance and diagnostic data from an aircraft, comprising:
    at the aircraft,
        receiving the maintenance and diagnostic data from a plurality line replaceable units;
        transmitting the maintenance and diagnostic data via a cellular communications infrastructure after the aircraft has landed, wherein the cellular communications infrastructure is accessed automatically upon landing of the aircraft; and at a data reception unit, receiving the transmitted maintenance and diagnostic data.

22. A method of transmitting maintenance and diagnostic data from an avionics system located on an aircraft, comprising:

receiving the maintenance and diagnostic data from a plurality of line replaceable units;

processing maintenance and diagnostic data; and transmitting the processed maintenance and diagnostic data via a cellular infrastructure after the aircraft has landed, wherein the cellular infrastructure is accessed automatically upon landing of the aircraft.

23. The method of claim 22, further comprising receiving said transmitted data at a flight operations center.

24. The method of claim 22, further comprising receiving said transmitted data at a flight operations center via a computer network.

25. The method of claim 22, further comprising receiving said transmitted data at a flight operations center via a telephone network.

26. The method of claim 19, wherein processing said data includes:

compressing the data;

encrypting the data;

segmenting the data; and constructing packets of data from said segmented data.

27. The method of claim 22, wherein receiving said transmitted data includes:

acknowledging receipt of said transmitted data;

reassembling said received data;

decrypting said reassembled data;

uncompressing said decrypted data; and storing said uncompressed data.

28. A method of transmitting maintenance and diagnostic data from an aircraft, comprising:

receiving maintenance and diagnostic data from a plurality of line replaceable units;

processing the maintenance and diagnostic data; and transmitting the processed maintenance and diagnostic data via a cellular infrastructure after the aircraft has landed, wherein processing said maintenance and diagnostic data includes:

receiving a signal which indicates that the data transmission process can begin;

initiating a data transfer;

compressing said maintenance and diagnostic data;

encrypting said compressed maintenance and diagnostic data;

creating a packet queue;

starting a primary data thread;

waiting a predetermined period of time;

determining if any threads are active;

repeating, when threads are active, the steps of waiting a predetermined period of time and determining if any threads are active; and exiting processing said data when no threads are active.

29. The method of claim 28 wherein starting a primary data thread includes:

initiating a PPP connection;

initiating a transfer session;

starting at least one secondary data thread;

determining if data remains in the primary data thread;

sending said data when data remains in the primary data thread;

determining if data threads are active when no data remains in the primary data thread;

repeating, when said threads are active, the step of determining if data remains in the primary data thread;

ending said session when no threads are active;

closing said PPP connection; and exiting starting a primary data thread.

30. The method of claim 29 wherein starting at least one secondary data thread includes:

(a) setting the secondary data thread to active;

(b) initiating a PPP connection;

(c) determining if data remains in the secondary data thread;

(d) sending a data packet when data remains;

(e) repeating step c when data remains;

(f) closing said PPP connection when no data remains;

(g) setting the secondary data thread to inactive;

(h) exiting starting at least one secondary data thread; and (i) repeating steps a through h for each secondary data thread.

31. The method of claim 30, wherein repeating steps a through h includes repeating steps a through h in parallel for each said secondary data thread.

32. A computer-implemented method of transmitting maintenance and diagnostic data from an aircraft, comprising:

receiving the maintenance and diagnostic data from a plurality of line replaceable units;

processing the maintenance and diagnostic data; and transmitting the processed data via a cellular infrastructure after the aircraft has landed; and receiving the transmitted data at a flight operations center, wherein receiving said transmitted data includes:

creating a socket;

receiving a message;

determining if said message is an initialization message;

initiating a session when said message is an initialization message;

determining if said message is a data message when said message is not an initialization message;

processing said message when said message is a data message;

determining if said message is an end session when said message is not a data message;

processing said message when said message is an end session; and repeating, when said message is not an end session message, the step of receiving a message.

33. The method of claim 32 wherein initiating a session includes:

allocating buffer space;

sending an initiation session acknowledgment; and returning to receiving a message.

34. The method of claim 32, wherein processing said message when said message is a data message includes:

copying said message to a buffer;

sending a data message acknowledgment; and returning to receiving a message.

35. The method of claim 32, wherein processing said message when said message is not an end session includes:

computing a checksum;

determining if said checksum is valid;

saving a buffer to a temporary file;

decrypting said temporary file;

uncompressing said temporary file;

sending an end session acknowledgment; and returning to receiving a message.

36. An article of manufacture comprising a computer program carrier, readable by a processor and embodying one or more instructions executable by the processor to perform the method of transmitting maintenance and diagnostic data from an avionics system located on an aircraft, the method comprising:

receiving maintenance and diagnostic data from a plurality of line replaceable units;

processing said maintenance and diagnostic data to prepare said data for transmission; and transmitting said processed data via a cellular infrastructure when said aircraft has landed, wherein the cellular infrastructure is accessed automatically upon landing of the aircraft.

* * * * *